J. Hurd.
Centrifugal Sugar Machine.
No. 607. Reissued Sept. 29, 1858.
Fig. 3.
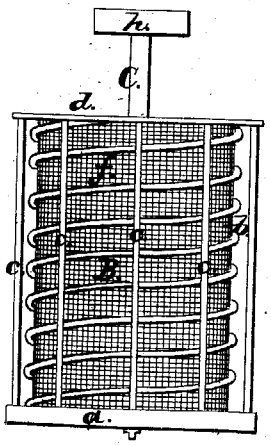
Fig. 1.
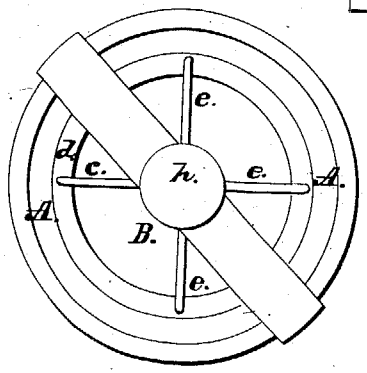
Fig. 2. Section
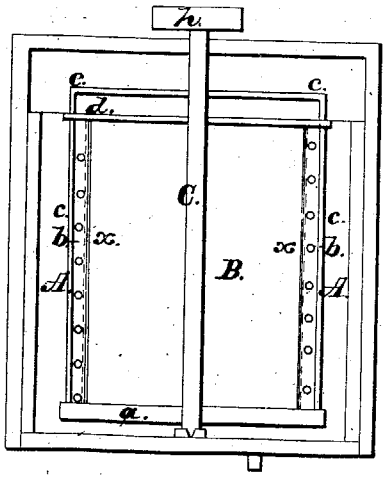

UNITED STATES PATENT OFFICE.

FRANCIS P. HURD, OF STONEHAM, MASSACHUSETTS, ASSIGNEE, BY INTERMEDIATE ASSIGNMENTS, OF JOS. HURD.

IMPROVEMENT IN CLEANSING SUGAR.

Specification forming part of Letters Patent No. 3,772, date October 3, 1844; Reissue No. 607, dated September 29, 1858.

*To all whom it may concern:*

Be it known that I, FRANCIS P. HURD, sole assignee of the patent granted to JOSEPH HURD on the 3d day of October, 1844, and sole administrator of the aforesaid JOSEPH HURD, now deceased, do hereby make known the following as a full and exact description and specification of the invention of JOSEPH HURD aforesaid.

The process of potting sugar or freeing it from sirups or treacle, (molasses,) as practiced in the West Indies and other countries, consists in allowing it to stand for a considerable period of time in hogsheads, casks, or cisterns having holes bored through their bottoms. The force of gravity causes the sirup or treacle to gradually descend through the sugar and escape through the holes in the bottom of the hogsheads. In order by the above operation to expel the sirup or liquid sufficiently to render the sugar fit for the market, much time is necessarily consumed. Besides, large "curing-houses," as they are termed, adapted for the purpose, must be erected and maintained.

My improvement consists in effecting the separation of the molasses by a machine of a peculiar construction, which accomplishes the same through the agency of centrifugal force.

Figure 1 represents a top view of the said machine. Fig. 2 is a central and vertical section thereof. It consists of a cylinder or other proper shaped cistern, A, surrounding and having within it another cylinder or other suitably shaped vessel, B, which is attached to or has a vertical shaft, C, passing through its axis or central part, as seen in Fig. 2, and so arranged in bearings and in other respects as to be capable of being revolved on its axis, and thereby impart a corresponding motion to the vessel B.

An external view of the vessel B as it appears when removed from the vessel A is given in Fig. 3. As a convenient and simple mode of making it, I construct it of a circular and solid bottom, *a*, (of wood or other proper material,) having raised upon it a cylindrical wire frame-work formed of strong wire or strips of metal wound in a helix and secured in such a form by any suitable number of vertical wires or rods or strips, C C, &c., inserted and confined in the plate or bottom *a*, and a metallic ring or rim, D, the latter of which is connected to the central shaft, C, by arms E E E E. The frame-work surrounds and is intended to give support to a hollow cylinder, F, of woven wire, whose inner surface is lined with flannel *x*, or other suitable material, the object of the whole being to suffer the escape of the sirups, molasses, or liquid matters through the sides of the vessel B, and at the same time to retain the sugar within it whenever the vessel is put in rapid revolution. The said vessel may be revolved within the cistern A by means of a pulley, H, fixed on the top of the shaft, around which (pulley) a band from the driving-power may extend and give motion to it.

The sugar containing the molasses is to be thrown into the interior of the vessel B, and when the said vessel is put in rapid revolution the centrifugal force generated in the molasses or sirup or liquid matter will expel it from the mass of sugar and drive it through the sides of the chamber B into the cistern surrounding the said chamber, from which it may be removed through an opening or faucet at I.

Such a machine is so effectual in discharging molasses, sirups, and other liquid matters from sugar that but a short time is required to effect by it what requires a very long period by the old process hereinabove detailed.

Although I have described such a machine as my own practical experience has proved to be of the simplest and most convenient kind for the purpose for which I have used it, yet others, varied in form and mode of construction, may be made to operate in a similar manner, so as to expel the sirup, molasses, or other liquid from the sugar containing the same.

The machine which is the subject of this specification effects its object—viz., that of expelling liquid from the mass of sugar—through the agency of centrifugal force alone. I also use the said machine for washing sugar, and this I effect by gradually pouring or discharging water or other cleansing-liquid upon or near the center or other suitable parts of the mass of sugar contained in the cylindric vessel B while the said vessel is in rapid revolution. The water or cleansing-liquid will thus be driven through the mass and sides of the vessel by the action of centrifugal force. After the sugar has been freed from molasses or other impurities in this machine, either by the action of centrifugal force alone or by washing, it will be found, as it were, plastered upon the inner periphery of the revolving cylinder. It is then to be removed therefrom by proper tools and lifted out of the open top of the vessel. The vessel will then be ready for the succeeding charge.

What is claimed as the invention of JOSEPH HURD, deceased, is—

1. The process of separating sugar from any liquid matters with which it may be mixed by filling the mixed mass into a vessel constructed substantially as described, and there acting upon the same by centrifugal force, substantially in the manner specified.

2. The washing of impurities out of the sugar by admitting a liquid into a vessel, substantially such as described, in which sugar is being exposed to the action of centrifugal force, as specified.

3. The process herein described of obtaining a mass of sugar freed from liquid impurities by filling the mixed mass into the top of a vessel constructed substantially as described, and having a closed bottom, and there exposing the mass to the action of centrifugal force, and then withdrawing the sugar out of the upper end of said vessel when separated, the whole as specified.

4. The process of obtaining a mass of washed sugar by charging sugar into the top of a vessel constructed, as specified, with a closed bottom, and then exposing such sugar to the action of centrifugal force, and while so exposed admitting currents of liquid to wash the sugar, and, finally, withdrawing the washed sugar out of the top or upper end of the vessel, the whole process being substantially such as specified, and being claimed by me as the invention of said JOSEPH HURD, deceased.

In testimony whereof I have hereunto subscribed my name, in the city of New York, on this 28th day of September, A. D. 1858.

FRANCIS P. HURD,
*Administrator of the estate of Joseph Hurd.*

In presence of—
G. B. HARTSON,
HENRY B. RENWICK.